United States Patent
Dutta

(10) Patent No.: US 9,173,008 B1
(45) Date of Patent: Oct. 27, 2015

(54) LAYERED VIDEO TRANSMISSION OVER COMMUNICATION CHANNELS

(71) Applicant: Xerox Corporation, Norwalk, CT (US)

(72) Inventor: Partha Dutta, Bangalore (IN)

(73) Assignee: XEROX CORPORATION, Norwalk, CT (US)

( * ) Notice: Subject to any disclaimer, the term of this patent is extended or adjusted under 35 U.S.C. 154(b) by 72 days.

(21) Appl. No.: 14/258,051

(22) Filed: Apr. 22, 2014

(51) Int. Cl.
| | |
|---|---|
| *H04H 60/32* | (2008.01) |
| *H04N 21/647* | (2011.01) |
| *H04N 21/4363* | (2011.01) |
| *H04N 21/414* | (2011.01) |
| *H04N 21/236* | (2011.01) |

(52) U.S. Cl.
CPC ............ *H04N 21/647* (2013.01); *H04N 21/236* (2013.01); *H04N 21/41407* (2013.01); *H04N 21/43637* (2013.01)

(58) Field of Classification Search
CPC . H04H 60/43; H04H 60/33; H04N 21/44222; H04N 2007/1739; H04N 7/17309
USPC .......................................................... 725/14
See application file for complete search history.

(56) References Cited

U.S. PATENT DOCUMENTS

| | | | |
|---|---|---|---|
| 6,546,555 B1 * | 4/2003 | Hjelsvold | H04N 21/23 348/E5.008 |
| 8,325,232 B2 | 12/2012 | Lee | |
| 2003/0197785 A1 * | 10/2003 | White | G11B 27/034 348/207.99 |
| 2004/0123328 A1 | 6/2004 | Coffey et al. | |
| 2009/0290021 A1 | 11/2009 | Rudesill et al. | |
| 2012/0007981 A1 | 1/2012 | Guerrera | |

* cited by examiner

*Primary Examiner* — Hunter B Lonsberry

(57) ABSTRACT

Embodiments of a method are disclosed for transmitting one or more videos provided by one or more video cameras disposed at a mobile object traveling along a pre-defined route. The method includes receiving the videos, bandwidth map data for multiple communication channels, travel time data for the mobile object, and service level agreement (SLA) parameters. The received video is transformed into multiple video layers. For each video layer, a transmission cost over the multiple communication channels is computed based on the bandwidth map data, the travel time data and the SLA parameters. Out of the multiple communication channels, a particular communication channel is selected for each video layer, which has the minimum transmission cost over the selected communication channel. The video layers are scheduled for transmission over the respective selected communication channels. The scheduled video layers are transmitted with respect to at least one of the SLA parameters.

33 Claims, 4 Drawing Sheets

LAYERED VIDEO TRANSMISSION OVER COMMUNICATION CHANNELS

TECHNICAL FIELD

Some of the disclosed embodiments relate to transmission of a video over communication channels, and more particularly to systems and methods for transmitting a layered video over wireless communication channels.

BACKGROUND

On-board surveillance can be important to ensure security and safety of passengers in a vehicle. Such surveillance is particularly important for public transport vehicles, such as buses, trains, aircraft, ships, etc., since the co-passengers may not know each other. Typically, the surveillance video feeds from the vehicles are transmitted to a central monitoring station (CMS), where the video feeds are monitored and archived.

The related art includes wireless transmission of surveillance video for different kinds of vehicles. For example, wireless transmission of video surveillance has been proposed for aircrafts in [U.S. Pat. No. 8,325,232], for cars and trucks in [US Patent Publication No. 2004/0123328 A1], and passenger surveillance for cars in [US Patent Publication No. 2009/0290021] and [US Patent Publication No. 2012/0007981].

SUMMARY

The related art methods and apparatus are subject to various disadvantages. For example, to be effective in deterring crime or serving other purposes, surveillance videos need to be delivered to a monitoring station either in real time or in near real time. Such video transmission generally requires high bandwidth, and the bandwidth requirement increases with the increase in video resolution. For surveillance, high resolution videos may be needed if the videos are used to identify participants in a security incident. The video transmission may additionally have time-varying uplink bandwidth. Moreover in case of a moving vehicle, the video transmission from the vehicle to the central monitoring station typically involves transmission over wireless networks, where the bandwidth is typically scarce. Especially for the uplink wireless channels (from the vehicle to the wireless base stations or to the wireless access points), and for the moving vehicular users, the available bandwidth is typically low and time-varying in nature. Further, data transmission, such as video data, over a cellular wireless network is generally expensive, but is relatively cheap over WI-FI networks. The total cost of such wireless transmission may be especially high for a large vehicle fleet (such as in the case of transit agencies) that requires continuous on-board monitoring. However, none of the available or existing video surveillance systems reduce or minimize the cost of transmitting the surveillance video over wireless networks, such as, to the central monitoring station. It may therefore be beneficial to provide methods and apparatuses capable of reducing or minimizing transmission costs of videos over wireless networks.

In accordance with some embodiments, systems and methods provide layered video encoding, including a base layer that provides a low resolution feed of the video, and one or more enhancement layers that enhance the resolution of the base layer. In accordance with some of these embodiments, the transmission of the surveillance video layers over multiple wireless connections is scheduled in a manner such that each layer is delivered within some given latency, e.g., the base layer is delivered with a small latency, and an enhanced layer is delivered after a moderate latency, and the cost of the wireless transmission is bounded. This latency aspect provides flexibility while scheduling transmission, and thereby reduces transmission costs.

In accordance with some of these embodiments, the methods and apparatuses take into account the following factors: (1) different latencies associated with the different video layers, and the penalty associated with late transmission; (2) maximum allowed budget for transmission; (3) different per-unit cost of transmission over each wireless connection; and (4) time-varying available bandwidths of different wireless connections. Some of the disclosed methods and apparatus assign video layers two different wireless connections for transmission, where the assignment may vary over time, while taking the above inputs and constraints into account. In other words, some of the disclosed embodiments are directed to video surveillance systems and methods for layered video encoding and opportunistic communication over multiple wireless networks to handle timing and cost requirements.

Some of the disclosed methods and apparatus combine both the cost of video transmission charged by wireless connection operators, and a penalty (user provided) for late delivery of video layers. The two costs are considered simultaneously, and a combination of them is minimized. This allows the operator to make a trade-off between transmission costs and latency requirements.

One exemplary embodiment includes a method for transmitting one or more videos provided by one or more video cameras disposed at a mobile object traveling along a pre-defined route. The method includes receiving the one or more videos, bandwidth map data for one or more communication channels, travel time data for the mobile object, and service level agreement (SLA) parameters. The method also includes transforming each of the received one or more videos into a plurality of video layers. The method further includes computing a transmission cost for each of the plurality of video layers over the one or more communication channels based on the bandwidth map data, the travel time data and the SLA parameters. The method furthermore includes assigning each of the plurality of video layers to a communication channel selected among the one or more communication channels. The selected communication channel provides a minimum transmission cost for an assigned video layer among the assigned plurality of video layers. The method also includes scheduling each of the assigned plurality of video layers for transmission over a respective selected communication channel among the one or more communication channels. The method further includes transmitting the scheduled plurality of video layers with respect to at least one of the SLA parameters.

Another exemplary embodiment includes a monitoring unit for use with one or more video cameras disposed on a mobile object capable of traveling along a pre-defined route. The one or more video cameras provide one or more videos. The monitoring unit includes an input module, a layering module, a control module, and a transmitting module. The input module is configured to receive the one or more videos, bandwidth map data for one or more communication channels, travel time data for mobile object, and service level agreement (SLA) parameters. The bandwidth map data and the travel time data are associated with the route. The layering module is configured to transform the received one or more videos into a plurality of video layers. The control module is configured to schedule each of the plurality of video layers for transmission over at least one communication channel among the one or more communication channels. The at least one communication channel being selected provides minimum transmission cost for at least one of the scheduled plurality of video layers. The transmitting module is configured to transmit the scheduled plurality of video layers over the respective at least one communication channel with respect to at least one of the SLA parameters.

Yet another exemplary module include a system for transmitting a video relating to a mobile object traveling along a predefined route via multiple wireless communication channels. The system includes an imaging unit and a monitoring unit. The imaging unit disposed at the mobile object and configured to capture a video relating to the mobile object. The monitoring unit is in communication with the imaging unit. The monitoring unit is configured to receive the captured video, bandwidth map data for the multiple communication channels, travel time data for the mobile object, and service level agreement (SLA) parameters. The monitoring unit is also configured to transform the received video into a plurality of video layers. The monitoring unit is further configured to compute a transmission cost for each of the plurality of video layers over the multiple communication channels based on the bandwidth map data, the travel time data and the SLA parameters. The monitoring unit is furthermore configured to assign each of the plurality of video layers to a communication channel selected from the multiple communication channels. The selected communication channel provides a minimum transmission cost for an assigned video layer among the assigned plurality of video layers. The monitoring unit is also configured to schedule each of the assigned plurality of video layers for transmission over a respective selected communication channel among the multiple communication channels. The monitoring unit is further configured to transmit the scheduled plurality of video layers with respect to at least one of the SLA parameters.

Other and further aspects and features of the disclosure will be evident from reading the following detailed description of the embodiments, which are intended to illustrate, not limit, the present disclosure.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

NON-LIMITING DEFINITIONS

In various embodiments of the present disclosure, definitions of one or more terms that will be used in the document are provided below.

A "video" is any time-varying sequence of images captured of a subject of interest using a video camera capable of acquiring a video signal over at least one data acquisition (imaging) channels. The video may also contain other components such as, audio, time reference signals, and the like.

A "mobile object" is used in the present disclosure in the context of its broadest definition. Although mobile object is disclosed herein in the context of vehicles such as buses, trains, and aircraft, the mobile object may be anything that moves regardless of whether or not it transports people or anything else. In fact, various aspects of the present disclosure may be applied to other mobile devices, such as satellites, etc.

A "central monitoring station" is used in the present disclosure in the context of its broadest definition. Although central monitoring stations are disclosed herein in the context of a centralized repository of multiple video feeds, it is intended that some central monitoring stations also include any recipient of a video transmission.

A "wireless network" is used in the present disclosure in the context of its broadest definition. For example, wireless network as used herein may be constituted by any type of computer network that uses wireless data connections for connecting network nodes.

A "communication channel" is used in the present disclosure in the context of its broadest definition. For example, communication channel as used herein constitutes any known, related art, and/or later developed pathway for communicating data from one location to another.

An "imaging unit" is used in the present disclosure in the context of its broadest definition. For example, imaging unit as used herein constitutes any known, related art, and/or later developed methods and apparatus for providing or transmitting data relating to images, representations or reproductions of an object's outward form.

The numerous references in the disclosure to systems or devices are intended to cover any and/or all devices capable of performing respective operations on the person in a network environment relevant to the applicable context, regardless of whether or not the same are specifically provided.

Exemplary Embodiments

Figure 1:
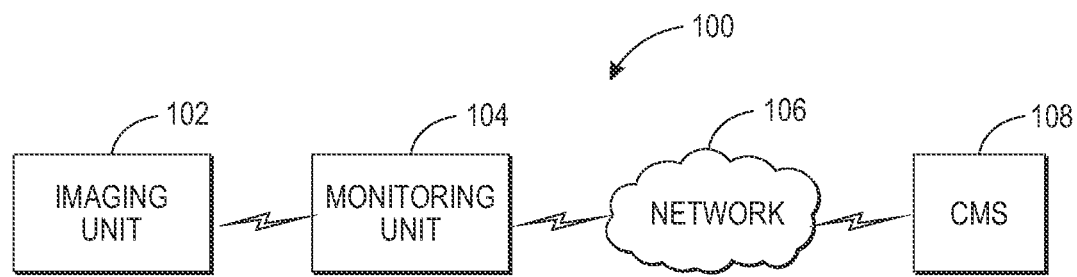
FIGS. 1-2 are schematics that illustrate network environments including an exemplary monitoring unit, according to some embodiments of the present disclosure.

FIG. 1 is a schematic that illustrates a first network environment 100 including an exemplary monitoring unit for transmitting a video over communication channels. The network environment 100 may include a number of units or devices configured to perform a number of operations required for transmitting the video over various communication channels to a desired location. In an embodiment, the network environment 100 includes an imaging unit 102, a monitoring unit 104, a network 106, and a central monitoring station (CMS) 108.

The imaging unit 102, such as a camera, may be installed with a mobile object (not shown). In some embodiments, the mobile object is a transport vehicle such as a bus, a car, an aircraft, a ship, etc. capable of carrying a person. Other embodiments may involve the mobile object as an unmanned vehicle or a device including, but are not limited to, a drone, a satellite, etc., which, however in some embodiments, may be capable of carrying a person. The mobile object may be configured to travel between various predetermined locations along a predefined route. For instance, a public bus may move from a Stop A to a Stop B. In some embodiments, the mobile object is stationary at predetermined time intervals. For instance, a public bus may start from Stop A at zero time interval and stop at Stop B after 5 minutes.

In some embodiments, the imaging unit 102 includes a color video camera such as an HD webcam with at least one imaging channel for capturing color values for pixels corresponding generally to the primary visible colors (typically RGB). In some other embodiments, the imaging unit 102 is an infrared camera with at least one imaging channel for measuring pixel intensity values in the near-infrared (NIR) wavelength range. In some embodiments, the imaging unit 102 is a hybrid device capable of capturing both color and NIR video. In some other embodiments, the imaging unit 102 is a multi/hyperspectral camera device capable of capturing images at multiple wavelength bands.

The imaging unit 102 may be configured for capturing a video of an ambient environment within or around, or both, the mobile object. The ambient environment may be identified in image frames of the captured video using, for example, object identification, pixel classification, material analysis, texture identification, pattern recognition methods, etc. The imaging unit 102 may be rotatable about a fixed support so that a field of view of the imaging unit 102 provides maximum coverage of the ambient environment. In some embodiments, multiple imaging units are disposed at the mobile object. The imaging unit 102 may communicate with the monitoring unit 104 over the network 106 including multiple communication channels.

The monitoring unit 104 may interface between the imaging unit 102 and the CMS 108. The monitoring unit 104 may be configured to receive the captured video from the imaging unit 102 to perform a number of tasks on the received video. The tasks may include, but are not limited to, transformation of the received video into a number of layers where each layer has a distinct video resolution and transmission of these layers over one or more communication channels in the network 106. Each video layer may be encoded into same or different video coding standards including, but are not limited to, Moving Picture Experts Group-2 (MPEG-2), MPEG-4, H.264/Advanced Video Coding (AVC), Scalable Video Coding (SVC), etc.

In an embodiment, the network 106 may be a wireless network. The network 106 may be a collection of individual networks, interconnected with each other and functioning as a single large network (e.g., the Internet or an intranet). Examples of the network 106 include, but are not limited to, local area network (LAN), wide area network (WAN), cable/telephone network, satellite network, and so on. The communication channels may be any wireless connection that is available over the predefined travel route of the mobile object. Examples of the communication channels include, but are not limited to, 2G telecommunication networks, 3G telecommunication networks, 4G telecommunication networks, Wi-Fi networks, satellite networks, etc.

The monitoring unit 104 may represent any of a wide variety of devices that provide services for the network. The monitoring unit 104 may be implemented as a standalone and dedicated "black box" including hardware and installed software, where the hardware is closely matched to the requirements and/or functionality of the software. The monitoring unit 104 may enhance or increase the functionality and/or capacity of the network to which it is connected. The monitoring unit 104 may be configured, for example, to perform e-mail tasks, security tasks, network management tasks including IP address management, and other tasks. In some embodiments, the monitoring unit 104 is configured not to expose its operating system or operating code to an end user, and does not include related art I/O devices, such as a keyboard or display. The monitoring unit 104 of some embodiments may, however, include software, firmware or other resources that support remote administration and/or maintenance of the monitoring unit 104. The monitoring unit 104 may be integrated with at least one of the mobile object or the imaging unit 102.

Figure 2:
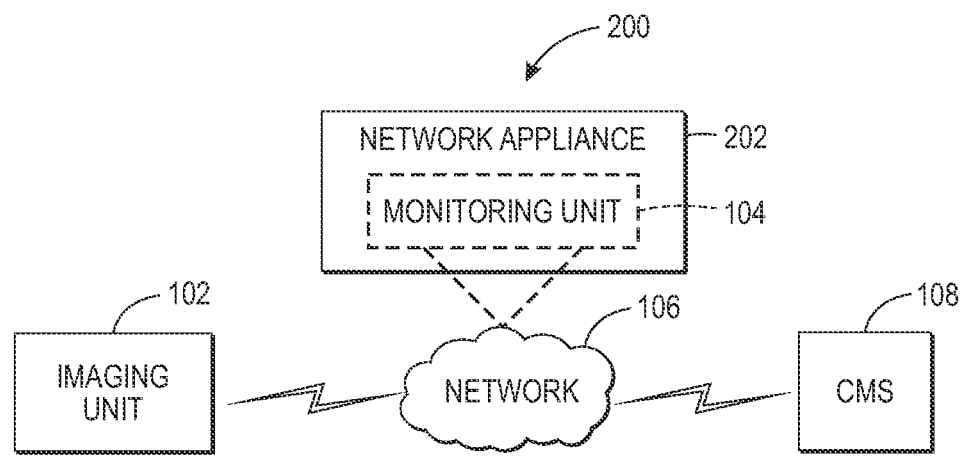

Similar to the first network environment 100, a second network environment 200 (FIG. 2) may implement the imaging unit 102, the monitoring unit 104, and the CMS 108 communicating over the network 106. In one embodiment, the network 106 may be established using a network appliance 202 that may be integrated with the monitoring unit 104. In other embodiments, the network appliance 202 may be preconfigured or dynamically configured to include the monitoring unit 104 integrated with other devices. For example, the monitoring unit 104 may be integrated with the CMS 108. The CMS 108 may include a module (not shown) that enables the CMS 108 being introduced to the network appliance 202, thereby enabling the network appliance 202 to invoke the monitoring unit 104 as a service. Examples of the network appliance 202 include, but not limited to, a DSL modem, a wireless access point, a router, a base transceiver station (BTS), a gateway, and a satellite for implementing the monitoring unit 104. The monitoring unit 104 may be configured to transmit the video layers to the CMS 108 over the communication channels in real time or near real time.

Figure 3:
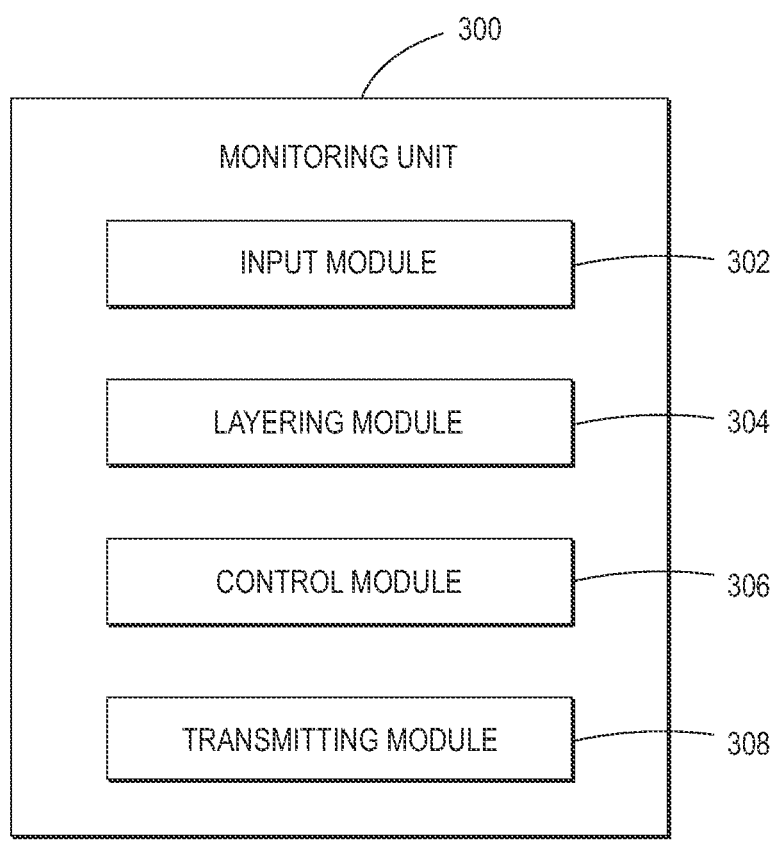
FIG. 3 is a schematic that illustrates the exemplary monitoring unit of FIG. 1, according to an embodiment of the present disclosure.

FIG. 3 illustrates an exemplary monitoring unit of FIG. 1, according to an embodiment of the present disclosure. In one embodiment, the monitoring unit 300 includes an input module 302, a layering module 304, a control module 306, and a transmitting module 308. The input module 302 may be configured to receive the captured video from the imaging unit 102. The input module 302 may also be configured to receive travel time data of the mobile object, for example, from third-party transit agencies or trip planning agencies or websites. The travel time data may include, but are not limited to, estimated travel times between predetermined locations for various predefined routes, dwell time at each stop, position of each location, etc. The dwell time may be defined as a time period for which the mobile object is stationary at a particular location.

The input module 302 may also be configured to receive bandwidth map data of various communication channels available in the network 106 while the mobile object is traveling on the predefined route. The bandwidth map data may include, but are not limited to, a bandwidth map, signal strength of the communication channels, usage costs of the communication channels, etc. The bandwidth map represents bandwidths B(i, t) for all the communication channels available between the predetermined locations along the predefined routes.

The usage costs of the communication channels refer to costs that may be incurred if data (for e.g., in bits) is transmitted over the communication channels. The usage cost associated with each of the communication channels may be same or different. For example, for Wi-Fi connection, the usage cost per transmitted bit is very low and the available bandwidth is high, but the connection may be available only at stoppage points of the mobile object. On the other hand, for 3G cellular connections, the usage cost per transmitted bit is high and the available bandwidth is moderate to low, but the 3G connection may be always available over the predefined route of the mobile object.

The input module 302 further receives service level agreement (SLA) parameters for transmission of the received video to the CMS 108. The SLA parameters include, but are not limited to, maximum transmission latency allowed for each video layer, upper bound on the average transmission cost ($C_{MAX}$) per time interval timeslot during the estimated travel time of the mobile object for the predefined route, and penalty cost for transmission of each video layer beyond the respective maximum transmission latency, etc. The average transmission cost is indicative of a budget for video transmission over the estimated travel time. The penalty represents the cost paid per unit data per time interval, if a video layer is not delivered within a predefined delay or maximum transmission latency. The penalty may be paid for the data of only for those video layers that are transmitted and delivered late at the CMS 108.

The input module 302 may provide the received video, the travel time data, and the bandwidth map data to the layering module 304. The layering module 304 may be configured to perform layered video encoding that involves transformation of the received video into a predetermined number of video layers, each having a distinct resolution. The layered video encoding may generate a base layer having the lowest resolution of the video, and one or more enhancement layers that improve the resolution of the base layer. The layering module 304 encodes each video layer at a constant bit rate such that the video layer includes a predetermined amount of data R(j) based on its resolution and encoding standard.

The control module 306 may be configured to receive the SLA parameters, the bandwidth map data, and the travel time data from the input module 302, and the generated video layers from the layering module 304. The control module 306 may be configured to determine transmission cost of each video layer over each of the communication channels in the network 106 based on the received bandwidth map data, the travel time data, and the SLA parameters. The control module 306 uses the transmission cost to select an available communication channel having the minimum transmission cost for a particular video layer, which is scheduled for transmission over the selected communication channel. The scheduled video layer is communicated to the transmitting module 308.

The transmitting module 308 is configured to transmit the scheduled video layer layered video over the selected communication channel to the CMS 108 via the network 106. The transmitting module 308 may include a separate buffer (not shown) for storing each of the scheduled video layers before transmission. Each buffer may operate in First-in-First-out (FIFO) order for transmitting the buffered video layers to the CMS 108 via the respective selected communication channels available between the predetermined locations along the predefined route of the mobile object. The transmitting module 308 may include any known, related art and/or later developed transmitter. Examples of the buffer may include, but are not limited to, EEPROM, flash memory, cache memory, SD-RAM, DDR-RAM, or storage units such as a file server used in a network-attached-storage (NAS) mode, a block-based storage server such as used in a storage area network (SAN), or other type of storage server, etc.

Figure 4:
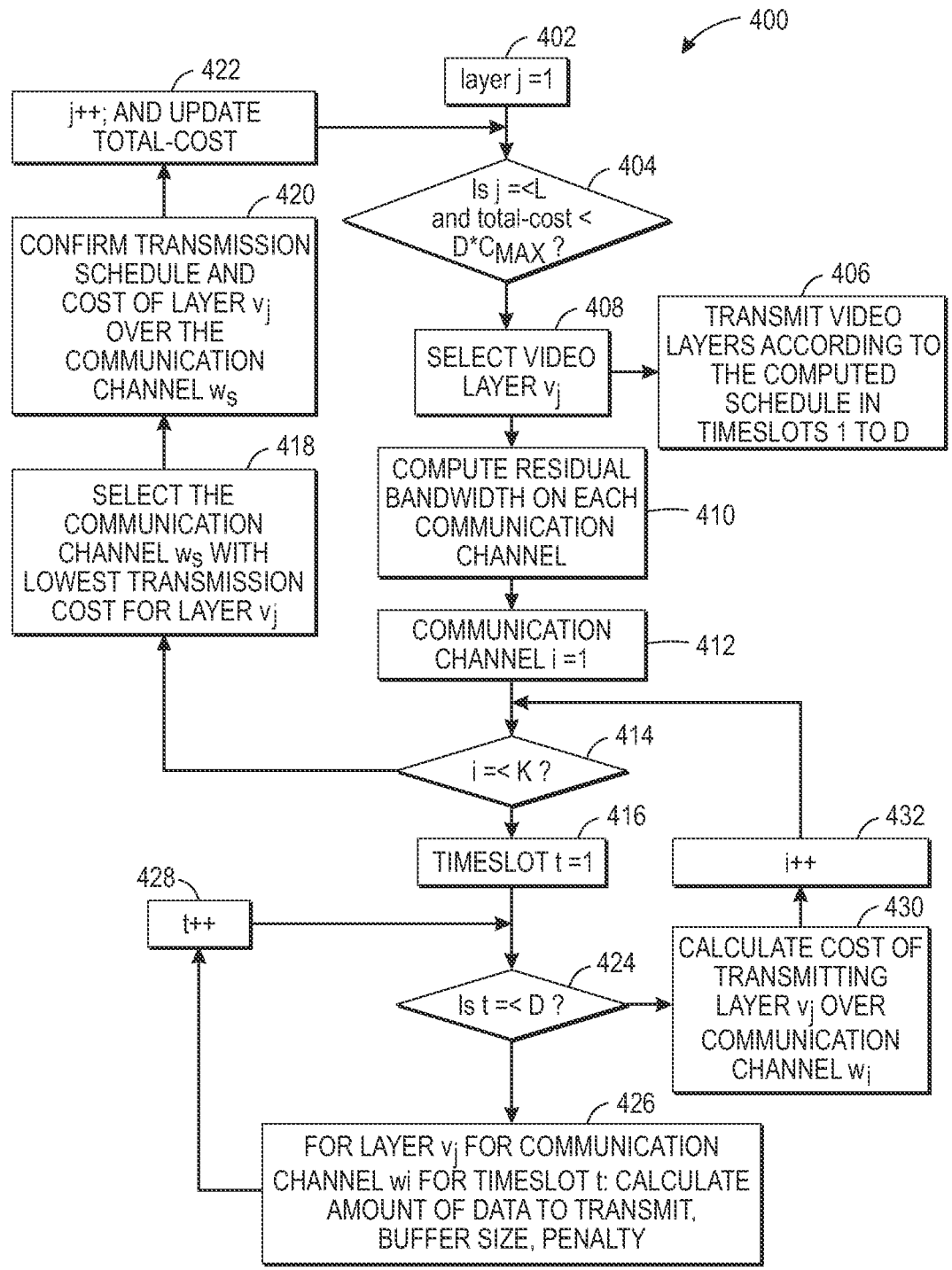
FIG. 4 illustrates an exemplary method for scheduling a video layer for transmission over a communication channel, according to an embodiment of the present disclosure.

FIG. 4 illustrates a method 400 for scheduling a video layer for transmission over a communication channel, according to an embodiment of the present disclosure. The exemplary method 400 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 400 is described is not intended to be construed as a limitation, and any number of the described method blocks may be combined or otherwise performed in any order to implement the method 400, or an alternate method. Additionally, individual blocks may be deleted from the method 400 without departing from the spirit and scope of the present disclosure described herein. Furthermore, the method 400 may be implemented in any suitable hardware, software, firmware, or combination thereof, that exists in the related art or that is later developed.

The depicted method 400 may be implemented on the control module 306 of the monitoring unit 300. In an embodiment, the method 400 is based on (i) the different latencies associated with the different video layers, and the penalty associated with late transmission of the captured video, (ii) maximum allowed budget for transmission, (iii) different per unit cost of transmission over each wireless communication channel, and (iv) time-varying available bandwidths of different wireless communication channels. The control module 306 may assign the video layers to different communication channels for transmission, where the assignment may vary over time based on the above four inputs and constraints. For the purpose of scheduling, the control module 306 may divide time into fixed sized intervals, called timeslots.

For each video layer and for each communication channel, the control module 306 may output the transmission schedule of the video layer on that channel. The control module 306 may be configured to execute the method 400 at each stop, for example, stop S1, of the mobile object to schedule a video layer transmission until the next stop, for example, stop S2. For ease of calculating the minimum transmission cost, timeslot 't' may be initialized from '1' at the departure of the mobile object from the stop S1, with D time slots until the departure time from the stop S2. In some embodiments, since calculation of minimum transmission cost is useful only if multiple video layers are available for transmission, the control module 306 may be configured to schedule the transmission of video layers one-by-one, starting from layer 1 representing the base layer to the highest layer in the video.

At any point, if a video layer cannot be transmitted due to exceeding the video transmission budget, the control module 306 may terminate the method, and no subsequent video layers may be scheduled for transmission. For each video layer, the control module 306 computes the cost of transmitting the video layer on each communication channel (while meeting the latency requirement based on the corresponding SLA parameter), and selects (or assigns) the communication channel, which has the lowest transmission cost for the video layer. The video layer may be then scheduled for transmission on the selected communication channel.

The control module 306 may be configured to compute values of various parameters at initialization and at the end of assigning each video layer to a communication channel. In an embodiment, these parameters may include: (1) ts(j, i, t) representing the number of bits (or data units) of each video layer vj that should be transmitted over each of the communication channels wi in a timeslot t, (2) RB(i, t) representing the residual bandwidth over the communication channels wi in the timeslot t after transmitting (if any of) the already scheduled video layers, and (3) c(j) representing the transmission cost for each video layer vj. In one example, ts(j, i, t) may be initialized to zero '0', RB(i, t) may be initialized to B(i, t), and c(j) may be initialized to zero '0', where:

t=timeslot; t=1, 2, . . . , D, where D=total number of timeslots in the estimated travel time of the mobile object traveling between the predetermined locations along the predefined route, i=channel vector; i=1, 2, . . . , K, where K=total number of communication channels available during the estimated travel time of the mobile object traveling between the predetermined locations along the predefined route, j=video layer vector; j=1, 2, ..., L, where L=total number of video layers generated for a received video by the layering module 304.

The method handles time-varying bandwidth of the communication channels. The method assumes that the actual available bandwidth of a communication channel is same as the predicted bandwidth (i.e., the prediction is accurate) over the scheduling duration (i.e., the estimated travel time between the predetermined locations along the predefined route). Also, the travel-time data is assumed to be accurate for the number of timeslots in the scheduling duration.

As shown in FIG. 4, the control module 306 may perform various steps to schedule each of the video layers for transmission over the communication channels on which the corresponding video layer has the minimum transmission cost. Within the scheduling duration for each video layer, the control module 306 may iterate over each available communication channel and computes the transmitted data, buffered data, and penalty of late transmission of the video layers, as discussed below.

At step 402, the control module 306 may set a video layer vector 'i' for which the transmission cost is to be computed over different communication channels. In one example, the control module 306 may set the video layer vector to '1' corresponding to the base layer of the video having the lowest resolution.

At step 404, the control module 306 may check various conditions for the set video layer vector. In one example, the control module 306 may check whether: (1) the set video layer vector is less than or equal to the total number of the generated video layers, and (2) the total transmission cost of the video layers over the respective communication channels is less than the total budget for video transmission, represented by $D*C_{MAX}$, where $C_{MAX}$ represents maximum transmission cost allowed per timeslot. If values of the set video layer vector is greater than 'L' and that of the total transmission cost is equal to or greater than D*CMAX, then a step 406 is performed, else a step 408 is performed.

At step 406, video layers may be transmitted according to the computed schedule in the timeslots from 1 to D based on certain conditions. A first scheduling condition may include a value of the video layer vector being greater than 'L'. This condition may represent that either there is only one video layer available for transmission or all the video layers below the video layer 'L' have already been scheduled. A second scheduling condition may include a value of the total transmission cost of the current video layer and the already scheduled video layers being greater than 'D*CMAX'. This condition may represent that the total transmission cost of the video layer, which is indicated by the set video layer vector, and that of the already scheduled lower layers exceeds the allowed budget (i.e., $D*C_{MAX}$) for the video transmission over the scheduling duration. The scheduling duration corresponds to the estimated travel time of the mobile object traveling between the predetermined locations along the predefined route. In an embodiment, when both the conditions are true, i.e., if the sum of the transmission cost $c_{tmp}(j, s)$ of the current video layer $v_j$ and the transmission cost of all lower video layers (that have already been scheduled) is more than the allowed budget (i.e., D*CMAX) for the video transmission over the timeslots 1 to D in the scheduling duration, then the current layer and all higher video layers are not transmitted, and the scheduling method is terminated.

At step 408, a video layer corresponding to the set value of the video layer vector is selected. For example, when the set value of the video layer vector is '1', the control module 306 may select the base layer of the video having the lowest resolution.

At step 410, the residual bandwidth on each of the wireless communication channels is computed. Each of the wireless communication channels have limited bandwidth, which may be used by multiple devices for transmission of data. Residual bandwidth of a wireless communication channel may refer to a bandwidth available over the communication channel in at least one timeslot in the scheduling duration after any of the scheduled video layers is transmitted. The control module 306 computes the residual bandwidths of all the communications channels available over the scheduling duration based on the bandwidth map data and the travel time data.

At step 412, a value of the channel vector 'i' is set. In one example, the control module 306 may set the value of channel vector to '1', which may correspond to a first communication channel available over the scheduling duration. In a similar manner, the control module 306 may set the value of channel vector from '1' to K for computing transmission cost of the selected video layer on different wireless communication channels available over the scheduling duration.

At step 414, the control module 306 may check whether the value of the channel vector is less than or equal to 'K', which represents the total number of communication channels available over the scheduling duration. The value of the channel vector greater than 'K' represents that the corresponding communication channels are unavailable for video transmission. If a value of the channel vector is greater than 'K', steps 418, 420, and 422 are performed, else a step 416 is performed by the control module 306.

At step 416, a value of the timeslot 't' is set. In one example, the control module 306 may set the value of the timeslot to '1' representing a first timeslot over the scheduling duration for the preset communication channel indicated by the channel vector 'i'.

At step 424, the control module 306 may check whether the value of the timeslot is less than or equal to 'D', which represents the total number of timeslots over the scheduling duration. The value of the timeslot T greater than 'D' represents that there are no more timeslots available in the scheduling duration. If the value of the timeslot is greater than 'D', steps 426 and 428 are performed, else steps 430 and 432 are performed by the control module 306.

At step 426, amount of data to transmit, buffer size, and penalty are calculated for the selected video layer in the preset communication channel during the preset timeslot. The control module 306 may compute various transmission data for the selected video layer. The transmission data may include, but not limited to, the data units of the selected video layer to be transmitted, a buffer size required for storing the selected video layer, potential penalty that may be levied if the selected video layer is not delivered to the CMS 108 within the predefined delay, etc. For each of the communication channel, the transmission data may be computed iteratively over the timeslots from 1 to D. Computation of the transmission data is discussed below using generalized equations based on variables 't' representing the timeslots in the scheduling duration, 'i' representing the channel vector, and 'j' representing the video layer vector.

The control module 306 computes temporary values of the transmission data, since the video layer is yet to be transmitted or scheduled. However, the final assignment of a communication channel to a video layer is determined only after considering all available communication channels for determining the transmission data for each video layer. The temporary transmission data is represent in Equations 1, 2, and 3 based on the assumption that the preset video layer is transmitted over a selected communication channel.

$$buf_{tmp}(j,i,t)=0 \quad (1)$$

In Equation 1, $buf_{tmp}(j, i, t)$ represents an assumed buffer size at the end of the timeslot. The buffer size is initialized to '0'.

$$ts_{tmp}(j,i,t) \quad (2)$$

In Equation 2, $ts_{tmp}(j, i, t)$ represents an assumed assignment of the amount of data of the video layer $v_j$ to be transmitted over a communication channel $w_i$ in the timeslot t.

$$pen_{tmp}(j,i,t) \quad (3)$$

In Equation 3, $pen_{tmp}(j, i, t)$ represents an assumed penalty for late transmission at the end of timeslot t for the assumed data in Equation (2) being delayed by more than maximum allowed latency $d_i$ for each video layer.

For a given timeslot t, the amount of data $ts_{tmp}(j, i, t)$ that is available for transmission is the sum of the buffered data at the end of previous slot and the data generated in the previous slot, i.e., $buf_{tmp}(j, i, t-1)+R(j)$. Since not more than $RB(i, t)$ amount of data can be transmitted in the given timeslot, the (assumed) transmitted data is shown in Equation 4:

$$ts_{tmp}(j,i,t)=\min\{(buf_{tmp}(j,i,t-1)+R(j)),RB(i,t)\} \quad (4)$$

In Equation 4, $RB(i, t)$ represents the residual bandwidth, which is a product of the amount of data $R(j)$ in a video layer to be transmitted and the bandwidth $B(i, t)$ available in the communication channel for transmission.

The amount of data left in the buffer at the end of given timeslot t is the amount of buffered data at the end of the previous slot (i.e., t−1), and the generated data $R(j)$, reduced by the transmitted data $ts_{tmp}(j, i, t)$, which will no longer be present in the buffer. The amount of data left in the buffer at the end of the given timeslot t is shown in Equation 5.

$$buf_{tmp}(j,i,t)=buf_{tmp}(j,i,t-1)+R(j)-ts_{tmp}(j,i,t) \quad (5)$$

Further, the penalty for late transmission is the amount of data left in the buffer from the delayed timeslots (i.e., $d_j$ slots) earlier multiplied by the user-define penalty $p_j$ to be paid per unit data per timeslot (or time interval) for the delay in transmission of the video layer. If a timeslot duration is less than or equal to the delay in transmission of the video layer (i.e., $t \le d_i$), then the data left from $d_j$ slot earlier is 0, and therefore the penalty $p_j$ is also zero. The amount of data left in the buffer from the previous timeslots may be obtained by subtracting the amount of data is generated in the last $d_j$ slots (i.e., $(R(j)*d_j)$ from the current buffer size $buf_{tmp}(j, i, t)$. The assumed penalty for late transmission of the video layers is shown in Equation 6.

$$pen_{tmp}(j,i,t)=p_j*\max\{(buf_{tmp}(j,i,t)-(R(j)*d_j)),0\} \text{ if } t>d_j, \text{ and } 0 \text{ if } t \le d_j \quad (6)$$

At step 428, the timeslot is incremented by a value '1'. Once the data units, the required buffer size, and the potential penalty associated with the selected video layer are calculated for a preset timeslot, the control module 320 may increment the timeslot by the value '1' to calculate the transmission data for the next timeslot. Based on the incremented value of the timeslot T, the step 424 may be performed again by the control module 306.

At step 430, a cost of transmitting the selected video layer over the preset communication channel is calculated. When the calculation of the transmission data for the selected video layer is complete for all the timeslots in the scheduling duration, the control module 306 may calculate the cost of transmitting the selected layer over the preset communication channel.

Based on Equations (1) to (6), the temporary total transmission cost for each of the video layers for each of the available communication channels over all the timeslots t may be computed. This temporary total transmission cost $c_{tmp}(j, i)$ is the sum of the assumed cost of transmitting the amount of data $ts_{tmp}(j, i, t)$ of the video layers (i.e., transmission cost of the video layers), and the assumed penalty for late transmission of the video layers $pen_{tmp}(j, i, t)$ over all the timeslots t, as shown in Equation 7.

$$c_{tmp}(j,i)=C(i,\Sigma_{t=0,\dots,D}ts_{tmp}(j,i,t))+\Sigma_{t=0,\dots,D}pen_{tmp}(j,t) \quad (7)$$

At step 432 the channel vector 'i' is incremented by a value '1'. Once the transmission cost for the preset video layer over the preset communication channel is calculated, the control module 306 may increment the channel vector 'i' by '1' to calculate the transmission data and the transmission cost for the selected video layer for the next available communication channel in the scheduling duration. Based on the incremented value of the channel vector 'i', the step 414 may be performed again by the control module 306.

At step 418, a communication channel with the lowest transmission cost for the preset video layer is selected. The channel vector having value in excess of 'K' represents that the transmission cost for the preset video layer is already calculated for each of the available communication channels. From these available communication channels, the control module 306 may select a communication channel for transmission for which the preset video layer has the minimum transmission cost $c(j)$. The control module 306 also assigns the preset video layer having the minimum transmission cost $c(j)$ to the selected communication channel.

At step 420, transmission schedule and the transmission cost is confirmed for the assigned video layer over the selected communication channel. The control module 306 may check the buffer in the transmitting module 308 to confirm whether (1) the selected communication channel is already buffered or scheduled to transmit the assigned video layer, or (2) the selected communication channel has no available bandwidth to support further transmission. If the assigned video layer is not scheduled for transmission with the selected communication channel and has bandwidth available for transmission, the control module 306 confirms the selected communication channel as available for transmission of the assigned video layer. The control module 306 then also retrieves and confirms the transmission cost of the assigned video layer calculated at step 430 for transmission over the selected communication channel. Generalized equation for the assigned video layers $ts(j, s, t)$ scheduled for transmission over the respective selected communication channels is shown in Equation (8). Also, generalized equations for the transmission cost $c(j)$ of the video layers is shown in Equation (9), and for the residual bandwidth $RB(s, t)$ of the selected communication channels for transmission of the next video layer (which is used at step 410 for the next video layer) is shown in Equation (10).

$$ts(j,s,t)=ts_{tmp}(j,s,t), \text{ and for all } i \neq 0 \text{ } s, ts(j,i,t)=0 \quad (8)$$

$$c(j)=c_{tmp}(j,s) \quad (9)$$

$$RB(s,t)=RB(s,t)-ts_{tmp}(j,s,t), \text{ and for all } i \neq s, RB(i,t) \text{ remains unchanged} \quad (10)$$

At step 422, a value of the video layer vector is incremented by '1' and the total transmission cost of the video is updated.

When the assigned video layer is scheduled for transmission over the selected communication channel, the control module 306 may increment the value of the video layer vector 'j' by '1' to schedule the next video layer for transmission over the corresponding communication channel for which this next video layer has the minimum transmission cost. The control module 306 may compute the total transmission cost of the captured video by summing the calculated minimum transmission cost for each video layer over the respective communication channels. Hence, after scheduling each video layer for transmission, the control module 306 may update the total transmission cost of the video over the available communication channels in the scheduling duration. Based on the incremented value of the video layer vector T, the step 404 may be performed again by the control module 306. The steps 402 through 432 are repeated for scheduling the next higher layer, until all the layers are scheduled.

The assumptions made in the scheduling method 400 may be valid if the duration of travel between two consecutive predetermined locations is below a relatively small time threshold, for example, up to 5 minutes. However, the predictions for the computed data might not be accurate for longer inter-location travel duration. In such a scenario, various modifications may be made to the method 400 according to an embodiment of the present disclosure.

The inter-location travel may be divided into multiple epochs (the number of which may not be known in advance) by the control module 306, and the last epoch might be of a shorter duration (if the inter-location travel duration is not an exact multiple of a predetermined epoch duration). The epoch may be defined as a fixed number of timeslots covering a short period of time (e.g., 1 minutes), less than the predefined time threshold.

For each epoch various parameters may be re-initialized for implementing the above method 400. These parameters may include timeslot T, the bandwidths B(i, t) of the available communication channels, the initial buffer size $buf_{tmp}$(j, i, t) for each video layer, etc. The timeslot 't' may be re-initialized to zero. The bandwidths B(i, t) of the available communication channels may be re-initialized at the beginning of each epoch, based on the latest bandwidth predicted by using the bandwidth map data and by computing the residual bandwidth, as discussed above, for each communication channel and for each timeslot in the epoch. The initial buffer size for each video layer may be set to the buffer size at the end of the last epoch for each epoch but except the first epoch in the inter-location interval. In other words, the initial buffer size $buf_{tmp}$(j, i, 0) may be set to the buffer size of the video layer at the end of the previous epoch. Further, the minimum transmission cost may be computed again for the video layers over the available communication channels in each epoch.

The modifications may be useful due to various reasons. In one example, the predictions (for both bandwidth and travel-time) may be more accurate when the prediction duration (e.g., an epoch) is smaller than the inter-location travel duration. In another example, the communication channel selected and assigned to a video layer may vary from epoch to epoch. Therefore, the scheduling method 400 may leverage time-varying wireless communication channels, for example, by assigning more video layers to a particular communication channel in those epochs in which the communication channel has high bandwidth, and less video layers may be assigned to the communication channel in the epochs where the communication channel has low bandwidth. Upon performing these modifications, the above discussed scheduling method 400 may be executed separately for each epoch by the control module 306.

Figure 5:
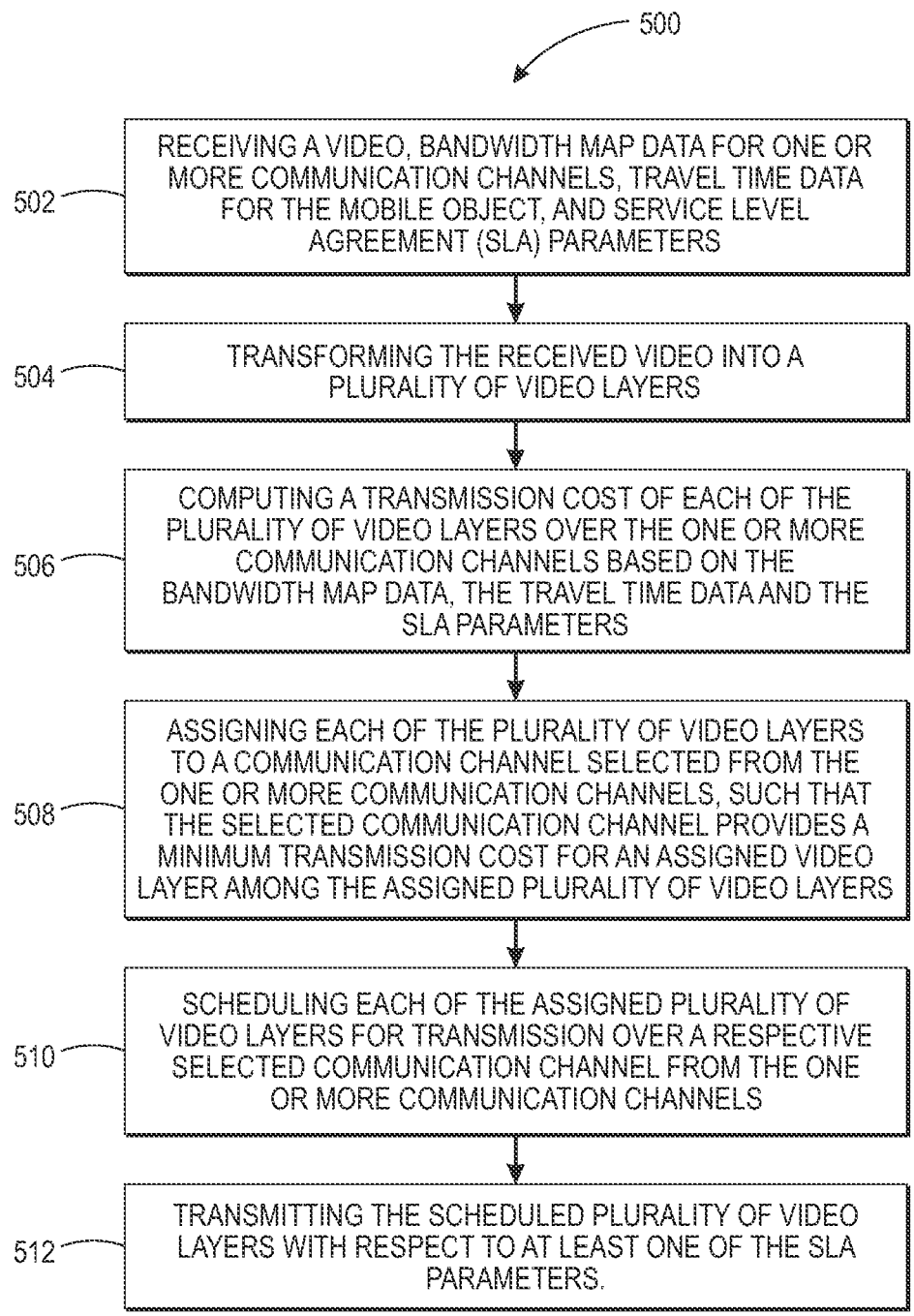
FIG. 5 is a schematic that illustrates an exemplary method for implementing the monitoring unit of FIG. 1, according to an exemplary embodiment of the present disclosure.

FIG. 5 is a schematic that illustrates an exemplary method 500 for implementing the monitoring unit of FIG. 1, according to an embodiment of the present disclosure. The exemplary method 500 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 500 is described is not intended to be construed as a limitation, and any number of the described method blocks may be combined or otherwise performed in any order to implement the method 500, or an alternate method. Additionally, individual blocks may be deleted from the method 500 without departing from the spirit and scope of the present disclosure described herein. Furthermore, the method 500 may be implemented in any suitable hardware, software, firmware, or combination thereof, that exists in the related art or that is later developed.

At step 502, a video, bandwidth map data for one or more communication channels, travel time data for a mobile object, and SLA parameters for video transmission are received. In communication with one or more imaging units, such as the imaging unit 102, the monitoring unit 300 may receive a video for being transmitted to the central monitoring system 108. The monitoring unit 300 may also receive bandwidth map data via a suitable interface. The bandwidth map data may include signal strength, bandwidth map, channel usage cost, etc. for each of the available communication channels. The bandwidth map provides a representation of bandwidths for the communication channels available between the predetermined locations along the predefined routes. The channel usage cost refers to the cost that may be incurred if data (e.g., in bits) is transmitted over a particular communication channel. The channel usage cost may be same or different for each of the communication channels.

The monitoring unit 300 may also receive the travel time data and SLA parameters via the suitable interface. The interface may include software interfaces, for example, an application programming interface, a graphical user interface, etc.; hardware interfaces, for example, cable connectors, a keyboard, an interactive display screen, etc.; or both. The travel time data may include an estimated travel time between various predetermined locations along various predefined routes, dwell time at each location, position of each location, etc. for the mobile object from which the received video is to be transmitted. This estimated travel time may be used as the video scheduling duration within which the received video is to be transmitted. The video scheduling duration may be divided into multiple timeslots. The SLA parameters may include the maximum latency allowed for video transmission, the video transmission budget, penalty cost for late video transmission, etc. The video transmission budget refers to a maximum average cost for transmitting the video over the scheduling duration.

At step 504, the received video is transformed into a plurality of video layers. The monitoring unit 300 may transform the received video into multiple video layers. The video layers may be encoded into same or different video coding standards at a constant bit rate. Each of the video layers has a distinct resolution and generates an amount of data units in each timeslot based on it resolution and encoding standard.

At step 506, a transmission cost of each of the plurality of video layers for transmission over the one or more communication channels based on the bandwidth map data, the travel time data, and the SLA parameters is computed. The monitoring unit 300 may calculate (1) the amount of data units associated with each video layer based on its resolution and the encoding standard, and (2) penalty cost for each video layer based on its maximum transmission latency allowed, the calculated amount of data units, and user-provided penalty cost for late transmission. The monitoring unit 300 uses the calculated values of the data units and penalty cost for computing the cost of transmission of each of the video layers over each of the available communication channels in the scheduling duration, as discussed above.

At step 508, a communication channel among the one or more communication channels is selected for each of the plurality of video layers, such that the selected communication channel provides a minimum transmission cost for the corresponding video layer among the plurality of video layers. Basis the computed transmission cost, the monitoring unit 300 selects a communication channel for which a particular video layer has the minimum transmission cost. In a similar manner, at least one communication channel is selected for each of the video layers having the minimum transmission cost over the selected at least one communication channel.

At step 510, each of the plurality of video layers is scheduled for transmission over the corresponding selected communication channel. The monitoring unit 300 creates a transmission schedule for each of the video layers. The transmission schedule includes each of the video layers being assigned to the respectively selected communication channels. In the transmission schedule, the video layers are arranged in a sequence to be followed for transmission of the video layers.

At step 512, one or more of the scheduled video layers are transmitted according to the SLA parameters. Once all the video layers are scheduled, the monitoring unit 300 transmits the video layers according to the created transmission schedule. In one example, a first video layer, such the base layer of the received video, may be transmitted first, followed by subsequent higher or enhancement layers in ascending order of the their respective resolutions. The monitoring unit 300 may continue to transmit the video layers according to the SLA parameters. For example, each of the video layers is associated with the minimum transmission cost basis its transmission over the scheduled or selected communication channel. The monitoring unit 300 may stop the scheduled transmission of the video layers when the total transmission cost associated with the transmitted video layers exceeds the video transmission budget.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for transmitting one or more videos provided by one or more video cameras disposed at a mobile object traveling along a pre-defined route, the method comprising:
   receiving the one or more videos, bandwidth map data for one or more communication channels, travel time data for the mobile object, and service level agreement (SLA) parameters;
   transforming each of the received one or more videos into a plurality of video layers;
   computing a transmission cost for each of the plurality of video layers over the one or more communication channels based on the bandwidth map data, the travel time data and the SLA parameters;
   assigning each of the plurality of video layers to a communication channel selected from the one or more communication channels, wherein the selected communication channel provides a minimum transmission cost for an assigned video layer among the assigned plurality of video layers;
   scheduling each of the assigned plurality of video layers for transmission over a respective selected communication channel from the one or more communication channels; and
   transmitting the scheduled plurality of video layers with respect to at least one of the SLA parameters.

2. The method of claim 1, further comprising computing remaining bandwidth of the selected communication channel after transmitting the respective scheduled plurality of video layers.

3. The method of claim 1, wherein transmitting the scheduled plurality of video layers is stopped when the total transmission cost of the transmitted plurality of video layers exceeds a predetermined video transmission budget.

4. The method of claim 1, wherein the scheduled plurality of video layers are transmitted in real time or near real time.

5. The method of claim 1, wherein each of the plurality of video layers has a distinct resolution.

6. The method of claim 1, wherein each of the plurality of video layers is associated with different transmission latency.

7. The method of claim 1, wherein the bandwidth map data includes a bandwidth map, signal strength of the one or more communication channels, and usage cost of the one or more communication channels, wherein the bandwidth map represents bandwidths for the one or more communication channels available between predetermined locations on the pre-defined route.

8. The method of claim 1, wherein the travel time data includes estimated travel time between any two predetermined locations along the predefined route and dwell time at each of the predetermined locations.

9. The method of claim 1, wherein the method is performed separately for predetermined number of time intervals when estimated travel time of the mobile object between predetermined locations along the pre-defined route exceeds a pre-defined time threshold.

10. The method of claim 1, wherein the SLA parameters include maximum transmission latency allowed for each of the plurality of video layers, maximum average transmission cost per time interval, and penalty cost for transmission of each of the plurality of video layers beyond the respective maximum transmission latency.

11. The method of claim 1, wherein computing the transmission cost is based on usage cost of each of the one or more communication channels and penalty cost for transmission of each of the plurality of video layers beyond a respective maximum transmission latency.

12. A monitoring unit for use with one or more video cameras disposed on a mobile object capable of traveling along a pre-defined route, the one or more video cameras providing one or more videos, the monitoring unit comprising:
- an input module configured to receive the one or more videos, bandwidth map data for one or more communication channels, travel time data for mobile object, and service level agreement (SLA) parameters, wherein the bandwidth map data and the travel time data are associated with the route;
- a layering module configured to transform the received one or more videos into a plurality of video layers;
- a control module configured to schedule each of the plurality of video layers for transmission over at least one communication channel from the one or more communication channels, wherein the at least one communication channel being selected provides minimum transmission cost for at least one of the scheduled plurality of video layers; and
- a transmitting module configured to transmit the scheduled plurality of video layers over the respective at least one communication channel with respect to at least one of the SLA parameters.

13. The monitoring unit of claim 12, wherein the control module is further configured to compute remaining bandwidth of the at least one selected communication channel after transmitting the at least one of the scheduled plurality of video layers.

14. The monitoring unit of claim 12, wherein the transmitting module is further configured to stop transmitting the scheduled plurality of video layers when the total transmission cost of transmitted plurality of video layers exceeds a predetermined video transmission budget.

15. The monitoring unit of claim 12, wherein the scheduled plurality of video layers are transmitted in real time or near real time.

16. The monitoring unit of claim 12, wherein each of the plurality of video layers has a distinct resolution.

17. The monitoring unit of claim 12, wherein each of the plurality of video layers is associated with different transmission latency.

18. The monitoring unit of claim 12, wherein the bandwidth map data includes a bandwidth map, signal strength of the one or more communication channels, and usage cost of the one or more communication channels, wherein the bandwidth map represents bandwidths for the one or more communication channels available between predetermined locations on the predefined route.

19. The monitoring unit of claim 12, wherein the travel time data includes estimated travel time between any two predetermined locations for the predefined route and dwell time at each of the predetermined locations.

20. The monitoring unit of claim 12, wherein the SLA parameters include maximum transmission latency allowed for each of the plurality of video layers, maximum average transmission cost per time interval, and penalty cost for transmission of each of the plurality of video layers beyond the respective maximum transmission latency.

21. The monitoring unit of claim 12, wherein the minimum transmission cost is based on usage cost of each of the one or more communication channels and penalty cost for transmission of each of the plurality of video layers beyond respective maximum transmission latency.

22. The monitoring unit of claim 12, wherein the mobile object is a vehicle capable of carrying at least one passenger.

23. A system for transmitting a video relating to a mobile object traveling along a predefined route via multiple wireless communication channels, the system comprising:
- an imaging unit disposed at the mobile object and configured to capture a video relating to the mobile object; and
- a monitoring unit in communication with the imaging unit, the monitoring unit being configured to:
  - receive the captured video, bandwidth map data for the multiple communication channels, travel time data for the mobile object, and service level agreement (SLA) parameters;
  - transform the received video into a plurality of video layers;
  - compute a transmission cost for each of the plurality of video layers over the multiple communication channels based on the bandwidth map data, the travel time data and the SLA parameters;
  - assign each of the plurality of video layers to a communication channel selected from the multiple communication channels, wherein the selected communication channel provides a minimum transmission cost for an assigned video layer among the assigned plurality of video layers;
  - schedule each of the assigned plurality of video layers for transmission over a respective selected communication channel among the multiple communication channels; and
  - transmit the scheduled plurality of video layers with respect to at least one of the SLA parameters.

24. The system of claim 23, wherein the monitoring unit is further configured to compute remaining bandwidth of the selected communication channel after transmitting the respective scheduled plurality of video layers.

25. The system of claim 23, wherein the monitoring unit is further configured to stop transmitting the scheduled plurality of video layers when the total transmission cost of transmitted plurality of video layers exceeds a predetermined video transmission budget.

26. The system of claim 23, wherein the scheduled plurality of video layers are transmitted in real time or near real time.

27. The system of claim 23, wherein each of the plurality of video layers has a distinct resolution.

28. The system of claim 23, wherein each of the plurality of video layers is associated with different transmission latency.

29. The system of claim 23, wherein the bandwidth map data includes a bandwidth map, signal strength of the multiple communication channels, and usage cost of the multiple communication channels, wherein the bandwidth map represents bandwidths for the multiple communication channels available between predetermined locations on the predefined route.

30. The system of claim 23, wherein the travel time data includes estimated travel time between any two predetermined locations for the predefined route and dwell time at each of the predetermined locations.

31. The system of claim 23, wherein the SLA parameters include maximum transmission latency allowed for each of the plurality of video layers, maximum average transmission cost per time interval, and penalty cost for transmission of each of the plurality of video layers beyond the respective maximum transmission latency.

32. The system of claim 23, wherein the transmission cost is based on usage cost of each of the multiple communication channels and penalty cost for transmission of each of the plurality of video layers beyond respective maximum transmission latency.

33. The system of claim 23, wherein the mobile object is a vehicle capable of carrying at least one passenger.

* * * * *